United States Patent
Shin et al.

(10) Patent No.: US 11,339,237 B2
(45) Date of Patent: May 24, 2022

(54) METHOD OF PREPARING THERMOPLASTIC RESIN, THERMOPLASTIC RESIN PREPARED THERFROM AND THERMOPLASTIC RESIN COMPOSITION COMPRISING THE SAME

(71) Applicant: LG CHEM, LTD., Seoul (KR)

(72) Inventors: Minseung Shin, Daejeon (KR); Mincheol Ju, Daejeon (KR); Sungwon Hong, Daejeon (KR); Insoo Kim, Daejeon (KR); Hyung Sub Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 32 days.

(21) Appl. No.: 16/627,715

(22) PCT Filed: Jul. 9, 2019

(86) PCT No.: PCT/KR2019/008422
§ 371 (c)(1),
(2) Date: Dec. 30, 2019

(87) PCT Pub. No.: WO2020/130254
PCT Pub. Date: Jun. 25, 2020

(65) Prior Publication Data
US 2021/0122866 A1    Apr. 29, 2021

(30) Foreign Application Priority Data

Dec. 21, 2018  (KR) .................. 10-2018-0167192
Jul. 1, 2019   (KR) .................. 10-2019-0078855

(51) Int. Cl.
C08F 236/04     (2006.01)
C08F 2/22       (2006.01)
C08F 212/10     (2006.01)
C08F 6/14       (2006.01)

(52) U.S. Cl.
CPC .............. *C08F 236/04* (2013.01); *C08F 2/22* (2013.01); *C08F 6/14* (2013.01); *C08F 212/10* (2013.01)

(58) Field of Classification Search
CPC ........ C08F 236/04; C08F 6/14; C08F 212/10; C08F 2/22
See application file for complete search history.

(56) References Cited

U.S. PATENT DOCUMENTS 5,521,231 A * 5/1996 Suzuki ............... C08F 291/00
                                              523/309
2007/0049666 A1  3/2007 Haworth et al.
2010/0152384 A1  6/2010 Toneri et al.
2015/0065651 A1* 3/2015 Takamido ............ C08F 279/06
                                              525/67
2016/0096957 A1  4/2016 Yoo et al.

FOREIGN PATENT DOCUMENTS

| EP | 1 306 408 A1 | 5/2003 |
|---|---|---|
| EP | 1 802 692 | 7/2007 |
| EP | 3 020 751 A1 | 5/2016 |
| EP | 3 037 446 A1 | 6/2016 |
| EP | 3 118 258 A1 | 1/2017 |
| JP | 2008505246 A | 2/2008 |
| KR | 201 40047084 A | 4/2014 |
| KR | 20140141067 A | 12/2014 |
| KR | 20170025721 A | 3/2017 |
| KR | 20170066106 A | 6/2017 |
| KR | 10-2018-0051839 A | 5/2018 |
| KR | 20180067800 A | 6/2018 |
| KR | 10-2009-0038510 A | 2/2021 |
| WO | 2006026696 A1 | 3/2006 |
| WO | WO2007024043 A1 | 3/2007 |

OTHER PUBLICATIONS

First Office Action dated Feb. 8, 2021 for Korean Patent Application No. 10-2019-0078855; 4 pages.
Search Report dated Oct. 15, 2019 for PCT Application No. PCT/KR2019/008422.
European Office Action for EP 19817929.3; dated Nov. 23, 2020; 8 pages.
English abstract of KR 10-2018-0051839; 1 page.

\* cited by examiner

*Primary Examiner* — Robert D Harlan
(74) *Attorney, Agent, or Firm* — Morgan, Lewis & Bockius LLP

(57) ABSTRACT

The present invention relates to a method of preparing a thermoplastic resin, a thermoplastic resin prepared by the same, and a thermoplastic resin composition including the same. More specifically, the method of the present invention includes a step of performing acid coagulation of emulsion polymerization latex, a step of treating coagulated slurry with a base and performing dehydration, and a step of adding a metal salt and water to dehydrated wet powder to adjust pH to 9 or more. According to the present invention, the method may increase the productivity of a thermoplastic resin, and the thermoplastic resin prepared by the method has excellent mechanical strength, thermal stability, and appearance properties. In addition, when the thermoplastic resin of the present invention is used in coating, the thermoplastic resin has an effect of improving the adhesive strength and appearance quality of a coating film.

15 Claims, No Drawings

METHOD OF PREPARING THERMOPLASTIC RESIN, THERMOPLASTIC RESIN PREPARED THERFROM AND THERMOPLASTIC RESIN COMPOSITION COMPRISING THE SAME

CROSS-REFERENCE TO RELATED APPLICATIONS

This application is a National Phase of International Application No. PCT/KR2019/008422, filed on Jul. 9, 2019, which claims priority to Korean Patent Application No. 10-2018-0167192, filed on Dec. 21, 2018, and Korean Patent Application No. 10-2019-0078855, re-filed on Jul. 1, 2019, based on the priority of the above patent, in the Korean Intellectual Property Office, the disclosures of each are incorporated herein by reference.

TECHNICAL FIELD

The present invention relates to a method of preparing a thermoplastic resin, a thermoplastic resin prepared by the same, and a thermoplastic resin composition including the same. More specifically, the present invention relates to a method of preparing a thermoplastic resin having high productivity, a thermoplastic resin having excellent mechanical strength, heat resistance, and appearance properties and improved thermal stability, and a thermoplastic resin composition including the thermoplastic resin. According to the present invention, when the thermoplastic resin of the present invention is used in coating, the thermoplastic resin has an effect of improving the adhesive strength and appearance quality of a coating film.

BACKGROUND ART

In general, when acrylonitrile-butadiene-styrene (ABS) latex is prepared using emulsion polymerization, an acid or metal salt is added and coagulation is performed to obtain ABS latex in a powder form. In this case, the characteristics of the obtained ABS latex depend on the type of coagulant used. When an acid coagulant is used, productivity and thermal stability are increased. However, a large amount of gas is generated during product processing, and a yellowing phenomenon occurs, resulting in deterioration in appearance quality. On the other hand, in the case of using a metal salt coagulant, compared with the case of using an acid coagulant, appearance properties are improved, but productivity is decreased. For these reasons, there is a need for a method of preparing a thermoplastic resin that can overcomes the problems encountered when using an acid coagulant or a metal salt coagulant.

In accordance with this need, a method of treating slurry generated as a result of acid coagulation with a base to remove a residual emulsifier, which causes gas generation during product processing, was developed. The method has an effect of improving appearance quality. However, when the above method is used, base treatment causes an emulsifier to remain in salt form (R—COO—Na$^+$), resulting in drastic decrease in thermal stability.

To overcome these problems and improve thermal stability, a method in which, after base treatment, acid treatment is performed once more to convert a residual emulsifier from a salt form into the form of R—COO—H has been proposed. As compared with a conventional resin prepared using an acid coagulant, a thermoplastic ABS resin prepared by this method has excellent appearance quality. However, the appearance quality of the thermoplastic ABS resin is still inferior to that of a resin prepared using a metal salt coagulant.

Recently, ABS resins for coating are widely used. When coating is performed using ABS resins, the adhesion and appearance quality of a coating film are considered important requirements. However, the thermoplastic ABS resin prepared by the above-described method has poor coating properties.

Therefore, it is necessary to develop a method of preparing a thermoplastic resin capable of improving productivity using an acid coagulant and to develop a thermoplastic resin having excellent appearance quality, thermal stability, and coating properties.

RELATED ART DOCUMENTS

[Patent Documents] KR 10-2017-0025721 A

DISCLOSURE

Technical Problem

Therefore, the present invention has been made in view of the above problems, and it is one object of the present invention to provide a method of preparing a thermoplastic resin having appearance properties equal or superior to that of a resin prepared using a metal salt coagulant, excellent thermal stability, and improved coating properties with high productivity; a thermoplastic resin prepared using the method; and a thermoplastic resin composition including the thermoplastic resin.

The above and other objects can be accomplished by the present disclosure described below.

Technical Solution

In accordance with one aspect of the present invention, provided is a method of preparing a thermoplastic resin including A) performing acid coagulation of emulsion polymerization latex; B) treating coagulated slurry with a base and performing dehydration; and C) adding a metal salt and water to dehydrated wet powder to adjust pH to 9 or more.

In accordance with another aspect of the present invention, provided is a thermoplastic resin prepared by the method of preparing a thermoplastic resin, wherein the thermoplastic resin has an oxidative induction time of 20 minutes or more.

In accordance with still another aspect of the present invention, provided is a thermoplastic resin composition including 10 to 60% by weight of the thermoplastic resin and 40 to 90% by weight of an aromatic vinyl compound-vinyl cyanide compound copolymer.

In accordance with yet another aspect of the present invention, provided is a method of preparing a thermoplastic resin composition including mixing and extruding 10 to 60% by weight of the thermoplastic resin according to the method of preparing a thermoplastic resin and 40 to 90% by weight of an aromatic vinyl compound-vinyl cyanide compound copolymer.

Advantageous Effects

The method of preparing a thermoplastic resin according to the present invention is highly productive. The thermoplastic resin prepared by the method of the present invention has equal or superior appearance properties to that of a resin prepared using a metal salt coagulant, excellent thermal stability, and improved coating properties. In addition, due to the improved coating properties, coating process efficiency can be improved, and process costs can be reduced.

Furthermore, the thermoplastic resin prepared by the method of preparing a thermoplastic resin according to the present invention can be mixed with an aromatic vinyl compound-vinyl cyanide compound copolymer to obtain a thermoplastic resin composition having excellent physical properties, such as appearance properties, heat resistance, and impact strength, and excellent thermal stability and coating properties. The thermoplastic resin composition of the present invention can be applied to industrial parts, electronic parts, automobile parts, and the like through painting press.

BEST MODE

Hereinafter, a method of preparing a thermoplastic resin, a thermoplastic resin prepared by the same, and a thermoplastic resin composition including the same according to the present invention will be described in detail.

The present inventors confirmed that, to solve the problems of the conventional art described above, when a thermoplastic resin was prepared by a method including a step of performing coagulation of emulsion polymerization latex using an acid coagulant, a step of treating a coagulated product with a base, and a step of adding a metal salt and water to adjust pH to a specific range, productivity was increased, and the thermal stability, appearance properties, and coating properties of the thermoplastic resin were improved. Based on these findings, the present inventors completed the present invention.

For example, the method of preparing a thermoplastic resin according to the present invention includes A) a step of performing acid coagulation of emulsion polymerization latex; B) a step of treating coagulated slurry with a base and performing dehydration; and C) a step of adding a metal salt and water to dehydrated wet powder to adjust pH to 9 or more. In this case, the productivity of the thermoplastic resin may be increased, and the thermal stability, appearance properties, and coating properties of the thermoplastic resin may be improved.

Hereinafter, the method of preparing a thermoplastic resin of the present invention will be described in detail stepwise.

A) Acid Coagulation Step

In the acid coagulation step of the present invention, an acid coagulant is added to emulsion polymerization latex to coagulate the emulsion polymerization latex. For example, based on 100 parts by weight (based on solids) of the emulsion polymerization latex, the acid coagulant may be contained in an amount of 0.5 to 4 parts by weight, 0.5 to 3 parts by weight, 0.7 to 2.5 parts by weight, or 1.5 to 2.2 parts by weight. Within this range, the productivity of the thermoplastic resin may be increased, and the thermal stability of the thermoplastic resin may be excellent.

For example, the acid may include one or more selected from sulfuric acid, hydrochloric acid, nitric acid, phosphoric acid, formic acid, and acetic acid. Preferably, the acid includes one or more selected from sulfuric acid, hydrochloric acid, formic acid, and acetic acid. More preferably, the acid is sulfuric acid.

For example, the acid coagulation step may be performed at a temperature of 60 to 90° C., preferably 75 to 85° C., more preferably 70 to 80° C. Within this temperature range, coagulation efficiency may be increased, thereby increasing the productivity of the thermoplastic resin.

For example, the acid coagulation step may be performed at a stirring speed of 150 to 400 rpm, 250 to 350 rpm, or 300 to 350 rpm for 5 to 20 minutes or 10 to 15 minutes, without being limited thereto.

For example, in the acid coagulation step, water and the acid may be mixed first and the resulting mixture may be added, or water and the acid may be separately added. Preferably, an acid coagulant is prepared by mixing the acid and water, and the acid coagulant is added in the form of an acidic aqueous solution.

For example, as the acid coagulant, the acidic aqueous solution may be an aqueous solution having a molar concentration of 0.01 to 1 M, preferably 0.03 to 0.8 M or 0.1 to 0.7 M. In addition, when the acid and water are separately added, the amount of water to be added is preferably determined so that the molar concentration of the acid coagulant is 0.01 to 1 M. Within this range, coagulation efficiency may be improved, thereby increasing productivity and thermal stability.

As another example, in the acidic aqueous solution, acid concentration may be 0.1 to 10% by weight, 1 to 6% by weight, 1 to 5% by weight, or 4 to 5% by weight. Within this range, coagulation efficiency may be improved, thereby increasing the productivity of the resin.

For example, in the acid coagulation step, the pH of the coagulated slurry may be 1 to 4.5, 1.5 to 4, or 2.5 to 4. Within this range, coagulation efficiency may be increased, thereby increasing the productivity of the thermoplastic resin.

For example, the emulsion polymerization latex may be a vinyl cyanide compound-conjugated diene-aromatic vinyl compound copolymer latex (hereinafter referred to as 'ABS-based resin latex').

For example, the ABS-based resin latex may be prepared by performing emulsion polymerization of 100 parts by weight of a monomer mixture containing 40 to 70% by weight (based on solids) of a conjugated diene polymer, 15 to 35% by weight of an aromatic vinyl compound, and 5 to 25% by weight of a vinyl cyanide compound; 0.01 to 5 parts by weight of an emulsifier; and 0.001 to 3 parts by weight of an initiator.

In the present specification, other additives, such as polywater and electrolytes, and polymerization conditions, such as reaction temperature and reaction time, which are not specifically mentioned, may be appropriately selected as needed, and use thereof is not particularly limited as long as the additives and the polymerization conditions are within a range generally applicable to preparation of ABS-based resin latex.

In the present specification, the conjugated diene polymer may include, for example, one or more selected from butadiene polymers, butadiene-styrene copolymers, butadiene-acrylonitrile copolymers, and ethylene-propylene copolymers. Preferably, the conjugated diene polymer is a butadiene polymer or a butadiene-styrene copolymer.

In the present specification, the aromatic vinyl compound may include, for example, one or more selected from styrene, alpha-methyl styrene, and para-methyl styrene. Preferably, the aromatic vinyl compound is styrene or alpha-methyl styrene. More preferably, the aromatic vinyl compound is styrene.

In the present specification, the vinyl cyanide compound may include, for example, one or more selected from acrylonitrile, methacrylonitrile, and ethacrylonitrile. Preferably, the vinyl cyanide compound is acrylonitrile.

In the present specification, the emulsifier may include, for example, one or more selected from alkyl aryl sulfonates, alkyl sulfates, alkyl ester sulfonates, carboxylates having 10 or more carbon atoms, alkyl (alkenyl) carboxylates, alkyl (alkenyl) succinates, fatty acid salts, rosinates, and oleates, without being limited thereto.

The method of the present invention may further include, after step A of performing acid coagulation, a step of aging the coagulated slurry. For example, aging of the coagulated slurry may be performed at 85 to 95° C. or 90 to 95° C. for 2 to 90 minutes or 10 to 60 minutes. In this case, the productivity of the thermoplastic resin may be further improved.

For example, the aging may be performed under a pressure of 0.1 MPa or more, 0.15 MPa or more, 0.15 to 0.3 MPa, 0.15 to 0.25 MPa, or 0.22 to 0.25 MPa. Within this range, the moisture content of powder may be reduced.

For example, the aging may be performed at a stirring speed of 100 to 400 rpm, 150 to 350 rpm, or 200 to 300 rpm. Within this range, due to re-assembly of component particles and increase in particle size, physical properties of the thermoplastic resin, such as impact strength and heat resistance, may be improved.

B) Base Treatment and Dehydration Step

In the base treatment step, a base is added to a coagulated slurry or a coagulated and aged slurry, and mixing is performed. In this case, since a residual acid is not included, the gloss and whiteness of a thermoplastic resin may be improved, thereby increasing the appearance quality of the thermoplastic resin.

For example, the base may include one or more selected from sodium hydroxide and potassium hydroxide. Preferably, the base is sodium hydroxide.

For example, the base treatment may be performed at a temperature of 0 to 100° C., preferably 30 to 90° C., more preferably 50 to 90° C. or 70 to 80° C. Within this range, the appearance quality of the thermoplastic resin may be further improved.

For example, the base treatment may be performed at a stirring speed of 10 to 500 rpm or 300 to 500 rpm for 1 to 60 minutes or 30 to 60 minutes. Within this range, a thermoplastic resin having excellent appearance quality may be prepared with high productivity.

In the base treatment step, water and the base may be mixed first and the resulting mixture may be added, or water and the base may be separately added. Preferably, the base and water are mixed and the mixture is added in the form of a basic aqueous solution.

For example, the basic aqueous solution may be an aqueous solution having a molar concentration of 0.01 to 5 M, preferably 0.5 to 4 M or 2 to 4 M. In addition, when the base and water are separately added, the amount of water to be added is preferably determined so that the molar concentration of the base is within the concentration range of the basic aqueous solution. Within this range, the productivity of the thermoplastic resin may be increased, and the appearance quality thereof may be improved.

As another example, in the basic aqueous solution, the concentration of the base may be 1 to 20% by weight, 5 to 15% by weight, or 8 to 12% by weight. Within this range, productivity and appearance quality may be improved.

For example, based on 100 parts by weight (based on solids) of the emulsion polymerization latex, the basic aqueous solution may be contained in an amount of 0.5 to 5 parts by weight, 0.5 to 3 parts by weight, or 1 to 2 parts by weight. Within this range, the productivity of the thermoplastic resin may be increased, and the appearance quality thereof may be improved.

In step B, dehydration methods commonly used in the art to which the present invention pertains may be used as the dehydration method of the present invention without particular limitation. For example, dehydration of the base-treated slurry may be performed using a centrifugal dehydrator or a compression-type dehydrator.

For example, the wet powder obtained after dehydration has a pH of 10.5 or more, preferably 11 or more, more preferably 11 to 11.5. Within this range, since the wet powder contains no residual acid, the gloss and whiteness of the thermoplastic resin may be improved, thereby improving appearance quality.

In the present specification, pH may be measured using a pH titration method or a pH meter conventionally used in the art to which the present invention pertains. As a specific example, a Mettler Toledo SevenExellence pH meter may be used, and when a sample is a wet powder rather than an aqueous solution, 10 g of the wet powder and 100 g of distilled water may be mixed and stirred for 10 minutes, and then pH may be measured.

C) Step of Adding Metal Salt and Water to Adjust pH to 9 or More

In the method of preparing a thermoplastic resin according to the present invention, to solve a problem of lowering thermal stability due to a residual emulsifier in salt form which is not removed even by base treatment after acid coagulation, a step of adding a metal salt and water to the dehydrated wet powder to adjust pH to 9 or more (but, lower than pH of dehydrated wet powder) may be included.

For example, the metal salt may include one or more selected from magnesium sulfate, magnesium chloride, calcium chloride, and aluminum sulfate. Preferably, the metal salt is magnesium sulfate. In this case, the productivity of the thermoplastic resin may be increased, and the appearance properties, thermal stability, and coating properties of the thermoplastic resin may be excellent. In particular, the appearance properties and coating properties of the thermoplastic resin may be greatly improved, and thus a high-quality thermoplastic resin may be provided.

For example, an emulsion polymerization latex prepared using a carboxylate emulsifier forms an RCOO—H type compound by combination of the emulsifier and an acid in an acid coagulation step. In a base treatment step, when sodium hydroxide is used as a base, the RCOO—H type compound reacts with the base to form an RCOO—$Na^+$ type compound. For example, if according to the present invention, in step C, magnesium sulfate is used as a metal salt, $(RCOO)_2$ Mg type compound is formed. Compared with a residual RCOO—$Na^+$ type compound generated when conventional base treatment is performed or a RCOO—H type compound generated when the $RCOO^-$ $Na^+$ type compound is treated with an acid, the $(RCOO)_2$ Mg type compound has excellent thermal stability, and thus a thermoplastic resin having excellent appearance properties and coating properties may be provided.

The metal salt may be contained in an amount of 0.05 to 0.5 parts by weight or 0.1 to 0.3 parts by weight based on 100 parts by weight (based on solids) of the emulsion polymerization latex. Within this range, the productivity of the thermoplastic resin may be increased, and the appearance properties and coating properties thereof may be greatly improved.

In step C, water and the metal salt may be mixed first and the resulting mixture may be added, or water and the metal salt may be separately added.

For example, the amount of water to be added may be determined so that the concentration of solids is 15 to 30% by weight or 15 to 20% by weight. Within this range, the productivity of the thermoplastic resin may be increased, and the appearance properties and coating properties thereof may be improved.

As another example, water may be contained in an amount of 230 to 570 parts by weight or 400 to 570 parts by weight based on 100 parts by weight (based on solids) of the emulsion polymerization latex. Within this range, the productivity of the thermoplastic resin may be increased, and the appearance properties and coating properties thereof may be greatly improved.

In step C, the metal salt and water are added to the dehydrated wet powder to adjust pH to 9 or more or 9 to 12, preferably 9 to 11 or 9 to 10.5 (but, lower than pH of dehydrated wet powder). Within this range, the heat resistance of the thermoplastic resin may be excellent, the appearance properties thereof, such as gloss and whiteness, may be improved, and at the same time, the coating properties thereof may be improved.

In addition, when the pH of the dehydrated wet powder is adjusted within the above range, there is an advantage that oxidative induction time (OIP), which is an index indicating the thermal stability of a thermoplastic resin, is greatly increased. This is because the metal salt introduced in step C reacts with the base remaining after step B to form a compound having a high decomposition point. For example, when, in step C, magnesium sulfate is added as the metal salt and, in step B, sodium hydroxide is added as the base, magnesium sulfate and sodium hydroxide react with each other as shown in Reaction formula 1 below to form magnesium hydroxide. In this case, since magnesium hydroxide has a high decomposition point as compared with a metal salt, magnesium hydroxide may increase an ignition point, thereby improving the thermal stability of a resin.

$$Mg^{2+}(aq)+2OH^-(aq)\rightarrow Mg(OH)_2(s) \quad \text{[Reaction formula 1]}$$

The method of preparing a thermoplastic resin according to the present invention may further include, after step C, a step of dehydrating and drying the wet powder, pH of which has been adjusted to 9 or more, to obtain a thermoplastic resin powder.

In the dehydration process performed after step C, any dehydration methods commonly used in the art to which the present invention pertains may be used without particular limitation. For example, dehydration of the acid-treated slurry may be performed using a centrifugal dehydrator or a compression-type dehydrator.

For example, the dehydration process performed after step C may be performed by adding 5 to 20 parts by weight, 5 to 15 parts by weight, or 8 to 13 parts by weight of water based on 100 parts by weight (based on solids) of the wet powder, pH of which has been adjusted to 9 or more. In this case, the dehydration process may be easily performed.

The moisture content of the wet powder obtained after the dehydration process is preferably 25% by weight or less or 22% by weight or less. In this case, the productivity of the resin may be improved.

In the present specification, moisture content was measured using a HR83-P moisture analyzer (Mettler-Toledo Co., Switzerland). In this case, the weight change before and after drying was measured after complete drying at 150° C., and the weight loss was expressed as a percentage.

Any known drying methods commonly used in the art to which the present invention pertains may be used in the drying process of the present invention without particular limitation. For example, in the drying process, air may be supplied to the dehydrated resin powder using a fluid bed dryer.

For example, the oxidative induction time of the thermoplastic resin obtained by the method of the present invention may be 20 minutes or more, 25 minutes or more, 20 to 30 minutes, 25 to 35 minutes, or 28 to 32 minutes. Within this range, the thermal stability of the thermoplastic resin may be increased, and the appearance properties thereof, such as whiteness, may be improved.

In the present specification, unless otherwise specified, oxidative induction time is measured using differential scanning calorimetry (DSC) according to standard measurement ASTM D3895. In this case, a thermoplastic resin powder is prepared, and under an isothermal condition of 190° C., time at which oxidation occurs is measured while 50 ml of oxygen per minute is supplied to the thermoplastic resin powder.

Hereinafter, the thermoplastic resin prepared by the method of preparing a thermoplastic resin of the present invention, the thermoplastic resin composition including the same, and the method of preparing the same will be described in detail. Since the thermoplastic resin of the present invention, the composition including the same, and the method of preparing the composition share all technical features included in the method of preparing a thermoplastic resin described above, repeated description is omitted.

For example, the thermoplastic resin of the present invention may be prepared by the method of preparing a thermoplastic resin and may have an oxidative induction time of 20 minutes or more. In this case, the mechanical strength, heat resistance, and appearance properties of the thermoplastic resin may be improved. In particular, when the thermoplastic resin is used in coating, the adhesive strength and appearance quality of a coating film may be improved.

For example, the thermoplastic resin composition of the present invention includes 10 to 60% by weight of the thermoplastic resin and 40 to 90% by weight of an aromatic vinyl compound-vinyl cyanide compound copolymer. In this case, the productivity, impact strength, heat resistance, gloss, and whiteness of the composition may be excellent.

For example, the method of preparing the thermoplastic resin composition of the present invention may include a step of mixing 10 to 60% by weight of the thermoplastic resin obtained by the method of preparing a thermoplastic resin and 40 to 90% by weight of an aromatic vinyl compound-vinyl cyanide compound copolymer and extruding the mixture. In this case, the impact strength, heat resistance, gloss, and whiteness of the obtained composition may be improved. In addition, due to a low "b" value measured using a color-difference meter, the appearance quality, thermal stability, and coating properties of the composition may be excellent.

As another example, the method of preparing the thermoplastic resin composition of the present invention may include a step of mixing 20 to 50% by weight of the thermoplastic resin and 50 to 80% by weight of an aromatic vinyl compound-vinyl cyanide compound copolymer and extruding the mixture. Within this range, the impact strength, heat resistance, gloss, and whiteness of the composition may be excellent, and at the same time, the appearance quality, thermal stability, and coating properties of the composition may be improved.

For example, the aromatic vinyl compound-vinyl cyanide compound copolymer may include 50 to 90% by weight of an aromatic vinyl compound and 10 to 50% by weight of a vinyl cyanide compound. As another example, the aromatic vinyl compound-vinyl cyanide compound copolymer may include 60 to 80% by weight of an aromatic vinyl compound and 20 to 40% by weight of a vinyl cyanide compound. Within this range, molding of the composition may be easily performed. In addition, the impact strength, heat resistance, gloss, and whiteness of the composition may be excellent, and at the same time, the appearance quality, thermal stability, and coating properties thereof may be improved.

For example, the aromatic vinyl compound may include one or more selected from styrene, alpha-methyl styrene, and para-methyl styrene. Preferably, the aromatic vinyl compound is styrene or alpha-methyl styrene. More preferably, the aromatic vinyl compound is styrene.

For example, the vinyl cyanide compound may include one or more selected from acrylonitrile, methacrylonitrile, and ethacrylonitrile. Preferably, the vinyl cyanide compound is acrylonitrile.

Optionally, the thermoplastic resin composition may contain one or more additives selected from lubricants, antioxidants, heat stabilizers, and light stabilizers. The additives may be added in an amount that does not deteriorate the effect of the present invention. Preferably, the additives may be contained in an amount of 5% by weight or less, 0.001 to 5% by weight, or 0.1 to 3% by weight based on the total weight of the composition.

For example, the extrusion may be performed at 150 to 300° C. and 100 to 500 rpm or at 200 to 300° C. and 200 to 300 rpm, without being limited thereto.

For example, the thermoplastic resin has a "b" value of 10 or less or 9.45 or less, which is measured using a color-difference meter (Color Quest II, Hunter Lab Co.). This indicates that the appearance quality of the thermoplastic resin is excellent.

In the present specification, the "b" value is measured using a color-difference meter (Color Quest II, Hunter Lab Co.). The "b" value may be a positive (+) or negative (−) value based on 0. A positive (+) "b" value indicates that a thermoplastic resin is yellow, and a negative (−) "b" value indicates that a thermoplastic resin is blue. When a resin has a positive "b" value, the absolute value of the "b" value is proportional to the degree of yellowing of the resin.

For example, the thermoplastic resin composition may have a plating adhesion of 15 N/cm or more, 15 to 20 N/cm, 16 to 20 N/cm, 16.5 N/cm or more, or 16.5 to 20 N/cm. Within this range, the coating properties of the thermoplastic resin composition may be excellent.

In the present specification, when plating adhesion is measured, a 10 mm wide scratch is formed on the front surface of a specimen plated with a thermoplastic resin composition having a length of 100 mm, a width of 100 mm, and a thickness of 3 mm. Then, values are measured while peeling off the coating film by 80 mm in the vertical direction using a push-pull gauge, and the obtained values are averaged to calculate plating adhesion.

In describing the method of preparing a thermoplastic resin and the method of preparing the thermoplastic resin composition according to the present invention, other additives, conditions, equipment, and the like not explicitly described may be appropriately selected and used without particular limitation within the range usually practiced in the art.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

The emulsion polymerization latex used in the preparation of the thermoplastic resin was prepared by the following method.

PREPARATION EXAMPLE 1

Preparation of Emulsion Polymerization Latex 90 parts by weight of deionized water, 60 parts by weight (based on solids) of butadiene polymer latex (average particle diameter of 3,000 Å), 15 parts by weight of styrene, 7.5 parts by weight of acrylonitrile, 0.1 parts by weight of alkenyl C16-18 succinate potassium salt (ELOPLA AS100) and 0.3 parts by weight of fatty acid potassium salt as emulsifiers, 0.04 parts by weight of tert-butyl hydroperoxide and 0.4 parts by weight of tert-dodecyl mercaptan as initiators, 0.05 parts by weight of sodium pyrophosphate, 0.05 parts by weight of dextrose, and 0.001 parts by weight of ferrous sulfide were added to a nitrogen-substituted polymerization reactor batchwise, and polymerization was performed for 1 hour while raising the temperature to 70° C. After polymerization, an emulsion containing 10 parts by weight of deionized water, 15 parts by weight of styrene, 7.5 parts by weight of acrylonitrile, 0.1 parts by weight of alkenyl C16-18 succinate potassium salt (ELOPLA AS100), 1.0 part by weight of fatty acid potassium salt, 0.04 parts by weight of tert-butyl hydroperoxide, 0.05 parts by weight of sodium pyrophosphate, 0.05 parts by weight of dextrose, 0.001 parts by weight of ferrous sulfide, and 0.1 parts by weight of cumene hydroperoxide was continuously added to the reactor for 60 minutes, heated to 80° C., and aged for 1 hour. After aging, the reaction was terminated.

EXAMPLE AND COMPARATIVE EXAMPLES

Example 1

Preparation of Thermoplastic Resin Powder

A) Acid Coagulation and Aging Step:

2.0 parts by weight of a 5 wt % sulfuric acid aqueous solution was added to 100 parts by weight of emulsion polymerization ABS resin latex (solids content of 45% by weight, average particle diameter of 3,400 Å) prepared according to Preparation Example 1. Then, coagulation was performed at 80° C. for 15 minutes, and aging was performed at 95° C. for 10 minutes.

B) Base Treatment and Dehydration Step:

1.4 parts by weight of a 10 wt % sodium hydroxide aqueous solution was added to the aged latex and stirred for 10 minutes to perform base treatment. After base treatment, the base-treated slurry was placed in a centrifugal dehydrator, and the same amount of water as the base-treated slurry was added thereto. Then, dehydration was performed for 90 seconds to obtain a wet powder. The pH of the obtained wet powder was 11.

C) Step of Adding Metal Salt and Water to Adjust pH:

400 parts by weight (based on solids) of water and 0.1 parts by weight of magnesium sulfate were added to the obtained wet powder to adjust pH to 9 or more. Specifically, the pH was 9.3.

D) Dehydration and Drying Step:

The pH-controlled slurry was placed in a centrifugal dehydrator, and the same amount of water as the slurry was added thereto. Then, dehydration was performed for 90 seconds, followed by washing. Thereafter, drying was performed in a 90° C. hot air dryer for 30 minutes to obtain an ABS resin powder.

Comparative Example 1

An ABS resin powder was obtained by the same method and under the same conditions as in Example 1, except that steps B and C were omitted.

Comparative Example 2

An ABS resin powder was obtained by the same method and under the same conditions as in Example 1, except that magnesium sulfate was used instead of sulfuric acid as a coagulant, and steps B and C were omitted.

Comparative Example 3

An ABS resin powder was obtained by the same method and under the same conditions as in Example 1, except that acid treatment in step C was performed by adding sulfuric acid instead of a metal salt, magnesium sulfate.

Comparative Example 4

An ABS resin powder was obtained by the same method and under the same conditions as in Example 1, except that, in step C, the amount of water added with a metal salt was changed from 400 parts by weight to 900 parts by weight. In this case, when a metal salt and water were added in step C, pH was 8.2.

Preparation of Thermoplastic Resin Composition 1.2 parts by weight of a lubricant and 0.2 parts by weight of an antioxidant are mixed with 100 parts by weight of a base resin containing 27% by weight of each of the ABS resin powders prepared in the examples and the comparative examples and 73% by weight of a styrene-acrylonitrile copolymer (LG Chem DP270 including a butadiene rubber polymer having an average particle diameter of 0.2 to 0.4 μm). Then, extrusion of the mixture was performed at 210° C. and 250 rpm, and an ABS resin composition pellet was prepared using a pelletizer. The prepared pellet was dried and injection-molded to obtain a specimen for measurement.

Test Example

The physical properties of the thermoplastic resins and the thermoplastic resin compositions according to the examples and the comparative examples were measured by the following methods, and the results are shown in Table 1.

Izod Impact Strength

An injection specimen having a thickness of about 6.4 mm was prepared according to the method specified in ASTM D256, a notch was formed on the specimen, and impact strength (unit: kg·cm/cm) was measured at room temperature (23° C.).

Moisture Content

When a thermoplastic resin powder was prepared, the moisture content of a wet powder obtained after the dehydration process of step D was measured using a HR83-P moisture analyzer (Mettler-Toledo Co., Switzerland). In this case, the weight change before and after drying was measured after complete drying at 150° C., and the weight loss was expressed as a percentage.

Distortion-Temperature Under Heat (HDT)

An injection specimen having a thickness of about 6.4 mm was prepared according to the method specified in ASTM D648, and distortion-temperature under heat (unit: ° C.) was measured under a load of 18.6 kg/cm$^2$.

Glossiness (Gloss, GU)

The gloss of an injection specimen was measured at an angle of 45° using a Gloss meter according to the method specified in ASTM D528.

Color and Whiteness (White Index, WI)

The L, a, b, and whiteness index (WI) values of an injection specimen were measured using a color-difference meter (Color Quest II, Hunter Lab Co.). L, a, and b each indicate a value of a coordinate axis indicating a unique color. "L" has a value of 0 to 100. When an "L" value is close to 0, a specimen is black, and when an "L" value is close to 100, a specimen is white. "a" has a positive (+) or negative (−) value based on 0. A positive (+) "a" value indicates that a specimen is red, and a negative (−) "a" value indicates that a specimen is green. "b" has a positive (+) or negative (−) value based on 0. A positive (+) "b" value indicates that a specimen is yellow, and a negative (−) "b" value indicates that a specimen is blue. When a specimen has a positive "b" value, the absolute value of the "b" value is proportional to the degree of yellowing of the specimen.

Plating Adhesion (Unit: N/cm)

A specimen for measuring physical properties prepared by injection molding was etched using a chromic acid/sulfuric acid solution. Then, a conventional plating process was performed to obtain a plated specimen having a length of 100 mm, a width of 100 mm, and a thickness of 3 mm, on which a chromium plating film was formed. Thereafter, a 10 mm wide scratch was formed on the front surface of the plated specimen. Then, values were measured while peeling off the plating film by 80 mm in the vertical direction using a push-pull gauge, and the obtained values were averaged to calculate plating adhesion.

Oxidative Induction Time (OIT)

The oxidative induction time of the ABS resin powder prepared as described above was measured using differential scanning calorimetry (DSC) according to ASTM D3895. Specifically, under an isothermal condition of 190° C., time (Unit: minute) at which oxidation occurs was measured while 50 ml of oxygen per minute was supplied to the ABS resin powder.

TABLE 1

| Classification | Examples | | | Comparative Examples | | | |
| --- | --- | --- | --- | --- | --- | --- | --- |
| | 1 | 2 | 3 | 1 | 2 | 3 | 4 |
| Coagulant type | Sulfuric acid | Sulfuric acid | Sulfuric acid | Sulfuric acid | Magnesium sulfate | Sulfuric acid | Sulfuric acid |

TABLE 1-continued

| | Examples | | | Comparative Examples | | | |
|---|---|---|---|---|---|---|---|
| Classification | 1 | 2 | 3 | 1 | 2 | 3 | 4 |
| Presence or absence of base treatment | ○ | ○ | ○ | x | x | ○ | ○ |
| Presence or absence of acid or metal salt treatment | Magnesium sulfate | Magnesium sulfate | Magnesium sulfate | x | x | Sulfuric acid | Magnesium sulfate |
| pH in step C | 9.3 | 10.1 | 10.9 | — | — | — | 8.2 |
| Measurement results of physical properties | | | | | | | |
| Impact strength [unit: kg · cm/cm] | 17.2 | 17.2 | 17.3 | 17.1 | 17.2 | 17.3 | 17.2 |
| Moisture content [% by weight] | 21.11 | 21.24 | 21.16 | 21.01 | 33.52 | 20.87 | 20.98 |
| HDT [° C.] | 105.9 | 105.8 | 150.9 | 104.5 | 105.7 | 105.7 | 105.9 |
| Glossiness [unit: GU] | 89.1 | 89.2 | 89.0 | 84.1 | 88.0 | 85.3 | 89.0 |
| b value | 9.43 | 9.45 | 9.45 | 14.46 | 11.46 | 13.01 | 9.46 |
| Whiteness | 48.5 | 48.6 | 48.6 | 41.5 | 48.0 | 47.1 | 48.6 |
| Plating adhesion [N/cm] | 16.9 | 16.8 | 16.9 | 13.6 | 16.2 | 13.5 | 16.8 |
| OIT [min.] | 28.3 | 28.8 | 28.5 | 27.1 | 13.2 | 26.1 | 10.3 |

Referring to Table 1, the moisture content of the resin powder of Examples 1 to 3 according to the method of preparing a thermoplastic resin of the present invention is similar to that of the resin powder of Comparative Example 1 in which coagulation is performed using sulfuric acid. These results indicate that the method of the present invention may increase the productivity of a thermoplastic resin powder. In addition, in the case of the thermoplastic resin compositions of Examples 1 to 3, the impact strength remains high, the heat resistance is slightly higher than that of the composition of Comparative Example 1, and the gloss and whiteness are the same as those of the composition of Comparative Example 2 in which a metal salt coagulant is used, indicating that the appearance quality of the thermoplastic resin composition of the present invention is excellent. That is, the present invention may solve the problems that occur in conventional acid coagulation and metal salt coagulation, and the resin composition of the present invention may satisfy productivity, impact strength, heat resistance, gloss, and whiteness. As shown in Table 1, in Examples 1 to 3, it can be confirmed that OIT is high while the "b" value is low. Both of these physical properties are related to the thermal stability of a material. When a thermoplastic resin composition is prepared according to the present invention, the thermal stability of the resin composition may be greatly improved. For reference, the "b" value is one of color values measured using a color-difference meter. When a composition has a positive "b" value, the absolute value of the "b" value is proportional to the degree of yellowing of the composition. Accordingly, it can be seen that the compositions of Examples 1 to 3 are less discolored due to heat in a high-temperature process and/or a molding process. In addition, OIT indicates time at which a material is oxidized under conditions that the material can be oxidized. As the OIT value increases, the thermal stability and oxidation resistance of a material increase. Accordingly, it can be seen that the thermal stability of the compositions of Examples 1 to 3 is excellent.

In addition, in the case of Examples 1 to 3, the adhesive strength of the coating films is very high, and plating defects such as swelling of a plating film and unplating are not observed. Therefore, the thermoplastic resin and the resin composition according to the present invention may improve the efficiency of a coating process and may greatly improve the appearance quality of a coating product.

On the other hand, in the case of Comparative Example 1, since base treatment and metal salt treatment are omitted, the gloss and whiteness are low resulting in deterioration in the appearance quality. In addition, due to the high "b" value, the thermal stability is low as compared with Example 1, and the coating properties are not improved.

In addition, in the case of Comparative Example 2, since a metal salt, magnesium sulfate, is used in a coagulation process, the moisture content is very increased, thereby lowering the productivity. In addition, due to high OIT, the thermal stability and oxidation resistance are poor.

In addition, in the case of Comparative Example 3, since an acid is added instead of a metal salt, the gloss, "b" value, whiteness, and OIT are very low as compared with examples, and the plating adhesion is very low.

In addition, in the case of Comparative Example 4 in which the metal salt treatment step is performed as in Example 1, but pH in this step is out of the range of the present invention, OIT is very low as compared with Example 1, and the thermal stability and oxidation resistance are very low.

The invention claimed is:

1. A method of preparing a thermoplastic resin, comprising:
    A) performing acid coagulation of emulsion polymerization latex;

B) treating coagulated slurry with a base and performing dehydration; and

C) adding a metal salt and water to dehydrated wet powder to adjust pH to 9 or more.

2. The method according to claim 1, wherein the emulsion polymerization latex is vinyl cyanide compound-conjugated diene-aromatic vinyl compound copolymer latex.

3. The method according to claim 1, wherein the acid coagulation comprises adding an acid comprising one or more selected from sulfuric acid, hydrochloric acid, nitric acid, phosphoric acid, formic acid, and acetic acid.

4. The method according to claim 1, wherein the acid coagulant is contained in an amount of 0.5 to 4.0 parts by weight based on 100 parts by weight (based on solids) of the emulsion polymerization latex.

5. The method according to claim 1, wherein the base treatment is performed by adding and mixing a base with water to form a basic aqueous solution and adding the basic aqueous solution to the coagulated slurry.

6. The method according to claim 1, wherein the base comprises one or more selected from sodium hydroxide and potassium hydroxide.

7. The method according to claim 1, wherein the metal salt is contained in an amount of 0.05 to 0.5 parts by weight based on 100 parts by weight (based on solids) of the emulsion polymerization latex.

8. The method according to claim 1, wherein the water is contained in an amount of 230 to 570 parts by weight based on 100 parts by weight (based on solids) of the emulsion polymerization latex.

9. The method according to claim 1, wherein the metal salt comprises one or more selected from magnesium sulfate, magnesium chloride, calcium chloride, and aluminum sulfate.

10. The method according to claim 1, wherein the method further comprises aging the coagulated slurry at 85 to 95° C. for 2 to 20 minutes between step A and step B.

11. The method according to claim 1, wherein the method further comprises, after step C, dehydrating and drying the wet powder, pH of which has been adjusted to 9 or more, to obtain a thermoplastic resin powder.

12. A thermoplastic resin prepared by the method according to claim 1, wherein the thermoplastic resin has an oxidative induction time of 20 minutes or more.

13. A thermoplastic resin composition, comprising 10 to 60% by weight of the thermoplastic resin according to claim 12 and 40 to 90% by weight of an aromatic vinyl compound-vinyl cyanide compound copolymer.

14. The thermoplastic resin composition according to claim 13, wherein a "b" value of the thermoplastic resin composition measured using a color-difference meter (Color Quest II, Hunter Lab Co.) is 10 or less.

15. The thermoplastic resin composition according to claim 13, wherein plating adhesion of the thermoplastic resin composition is 15 N/cm or more.

* * * * *